United States Patent [19]
Hurst

[11] 3,977,503
[45] Aug. 31, 1976

[54] CLUTCH
[75] Inventor: John W. Hurst, Port Huron, Mich.
[73] Assignee: Chrysler Corporation, Highland Park, Mich.
[22] Filed: July 23, 1975
[21] Appl. No.: 598,313

[52] U.S. Cl. .................. 192/21; 192/48.91;54;93 A
[51] Int. Cl.² ................. F16D 43/21; F16D 13/28
[58] Field of Search .............. 192/48.91, 21, 51, 52, 192/54, 93 A

[56] References Cited
UNITED STATES PATENTS

| | | | |
|---|---|---|---|
| 2,068,885 | 1/1937 | Lyman et al. | 192/52 |
| 2,675,898 | 4/1954 | Morgan | 192/54 X |
| 3,762,241 | 10/1973 | Roper | 192/54 X |
| 3,901,361 | 8/1975 | Brownlie | 192/21 |

*Primary Examiner*—Allan D. Herrmann
*Attorney, Agent, or Firm*—Talburtt & Baldwin

[57] ABSTRACT

Corresponding sets of radially distributed helical surfaces in a cone clutch for axially urging either of two female cone members into more positive engagement with a male cone member and for driving a clutch output member or members.

20 Claims, 9 Drawing Figures

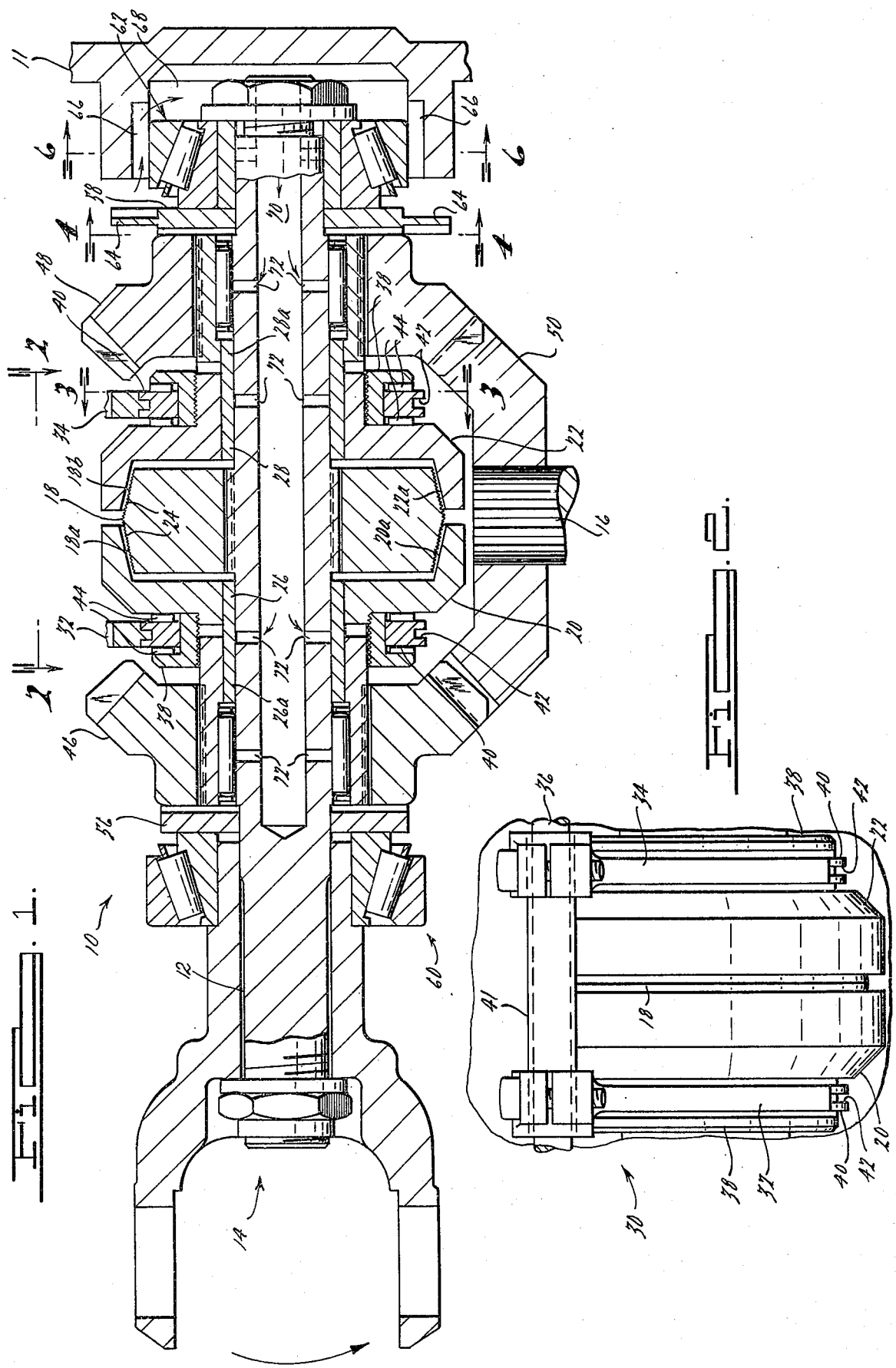

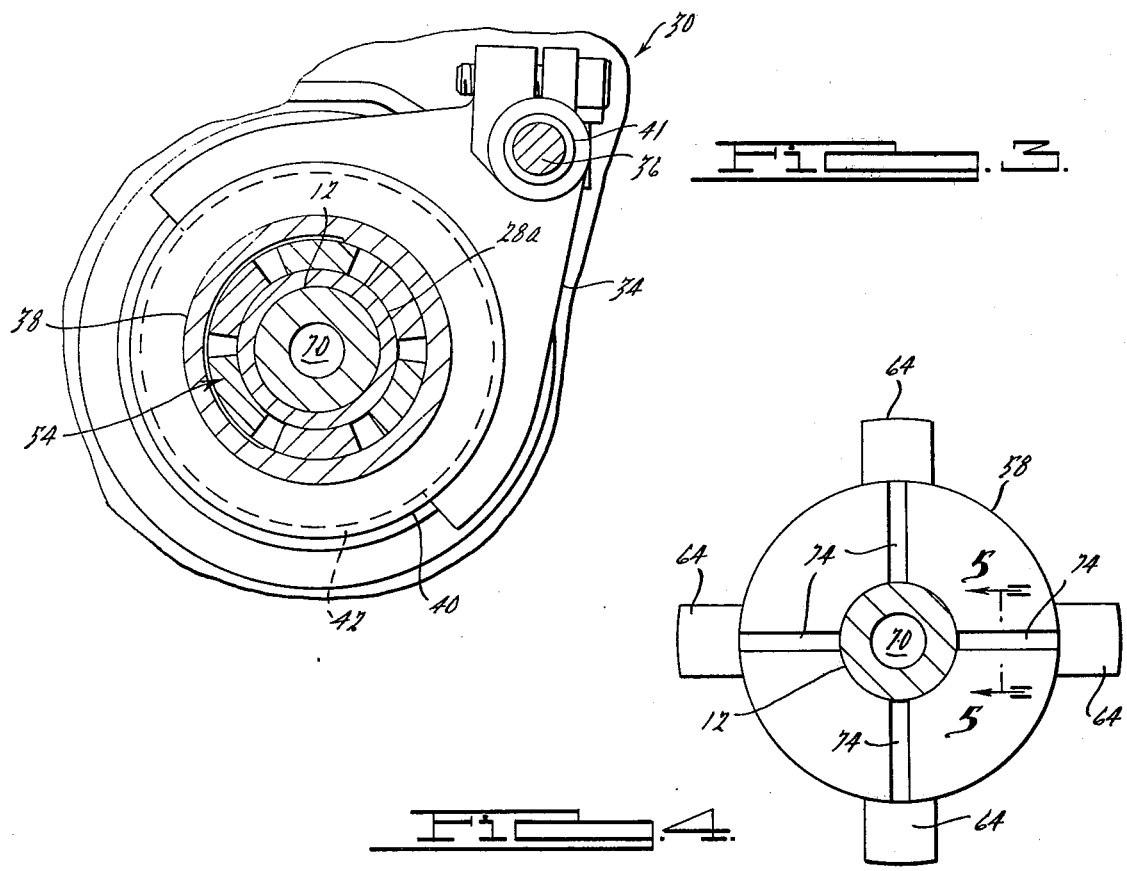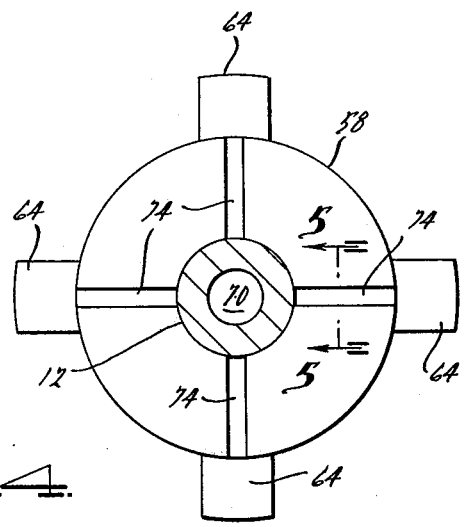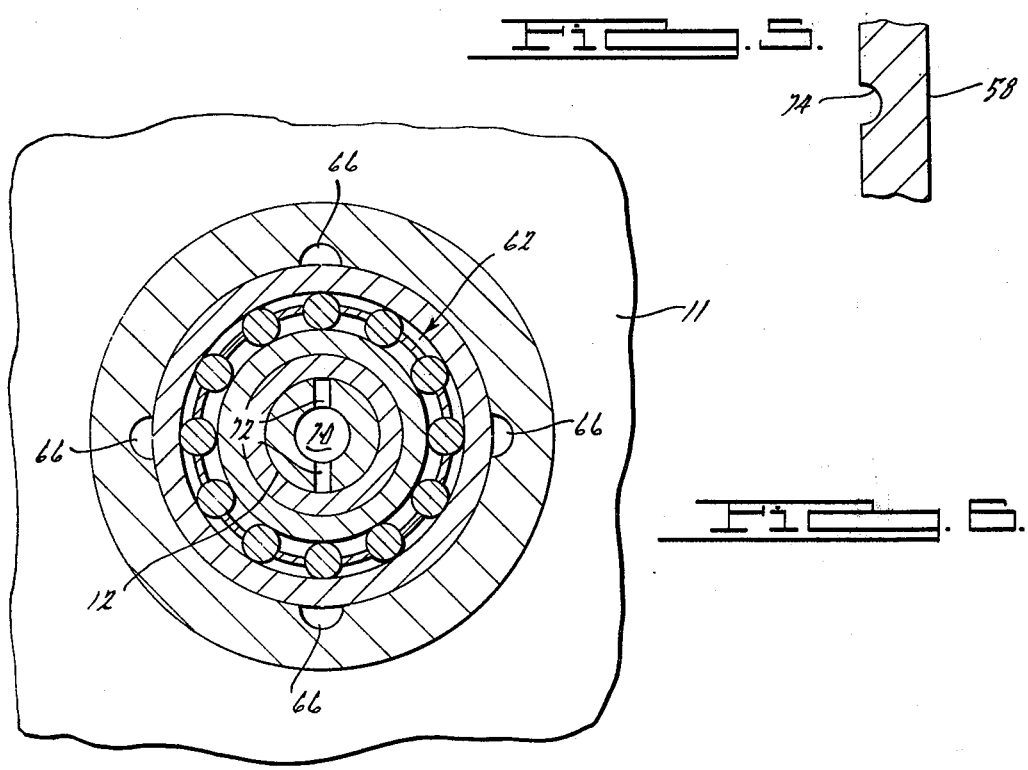

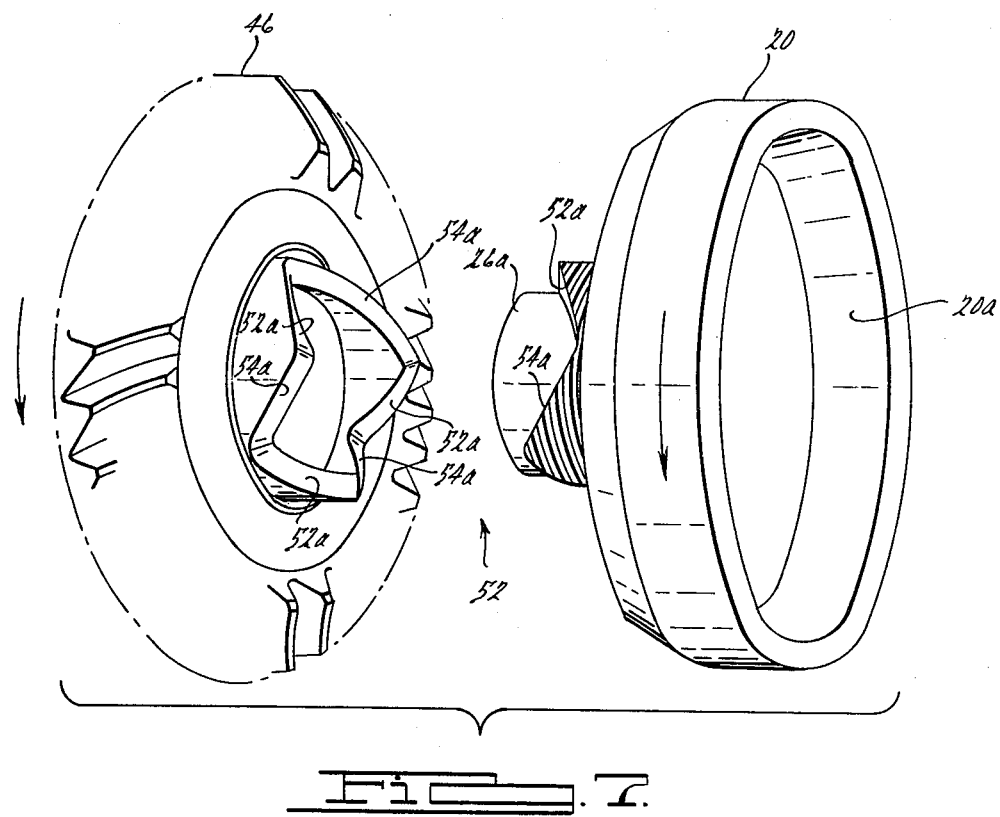
FIG. 7.
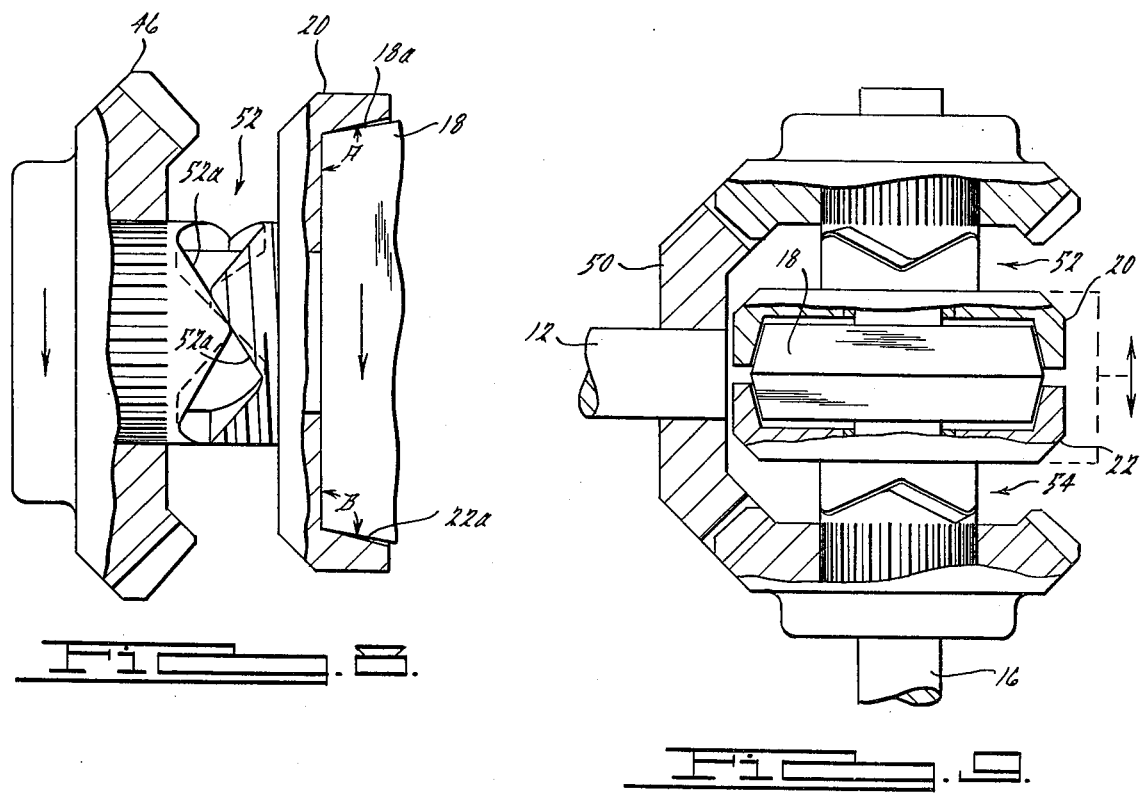
FIG. 8.
FIG. 9.

CLUTCH

BACKGROUND OF THE INVENTION

The invention relates to drive couplings and more particularly to clutches. In its most preferred form it comprises a cone clutch or reversing transmission for inboard-outboard marine drive units such as the type shown in U.S. Pat. No. 3,893,407 for example or for outboard motors and other marine drive devices.

Previous marine drive devices have included various types of dog clutches and cone clutches. Some have been designed for actuation to be effected on a helical or spirally extending spline as shown in U.S. Pat. Nos. 3,212,349 and 3,269,497.

SUMMARY OF THE INVENTION

In the preferred embodiment corresponding radially distributed helical camming surfaces carried on abutting end portions of a gear and an axially moveable female cone are in axial overlapping relationship whereby the camming surfaces therebetween are able to drivingly engage each other when the gear or the female cone is rotated. In a preferred embodiment, female cone rotation is initiated by axial movement thereof into engagement with a rotatable male cone. Upon rotation of the female cone by the male cone, driving engagement of the axially overlapping helical cam surfaces of the abutting female cone and gear occurs whereby the gear is rotated to provide rotation to output means. In addition, the camming surfaces coact to urge the female cone into more positive engagement with the male cone.

THE DRAWINGS

FIG. 1 is a side elevational view in section of a reversing clutch embodying various features of the invention. It is particularly designed for use in an inboard-outboard marine drive unit.

FIG. 2 is a fragmentary plan view of an upper portion of FIG. 1 taken from line 2—2 in FIG. 1.

FIG. 3 is a fragmentary sectional view taken along line 3—3 of FIG. 1.

FIG. 4 is a fragmentary sectional view taken along line 4—4 of FIG. 1.

FIG. 5 is a fragmentary sectional view taken along line 5—5 of FIG. 4.

FIG. 6 is a fragmentary sectional view taken along line 6—6 of FIG. 1.

FIG. 7 is an exploded detail perspective view of a part of a female cone and gear showing the helical surfaces on abutting end portions of the members.

FIG. 8 is a fragmentary sectional view of both the helical surfaces of a gear and female cone in driving engagement and the conical surfaces of female and male cones in driving engagement.

FIG. 9 is an alternate embodiment of a clutch embodying features of the invention and also showing both the helical surfaces of the female cones and gears in a neutral condition and the conical surfaces of the female and male cones in a neutral condition.

PREFERRED EMBODIMENTS

FIG. 1 shows a reversing clutch generally designated 10, such as may be included in the outboard power leg of an inboard-outboard marine propulsion unit or stern drive having an upper housing portion 11 (shown fragmentarily) on an outboard power leg (not shown). Such arrangements are well known and are described in the aforementioned patents. As is conventional in such units, an input shaft 12 is adapted as at 14 for connection to the output shaft (not shown) of an inboard mounted engine whereby input shaft 12 may be rotated to drive a propeller (not shown) carried on a lower portion of the outboard power leg. Input shaft 12 carries various clutch members which coact in combination to provide a reversible rotary output to an output shaft 16, which drives the propeller on the power leg.

Fixed to shaft 12 and rotatable therewith is a first drive member or male cone member 18 having opposing frusto-conical convex faces 18a and 18b. Toward each side i.e., on opposite sides, of male cone member 18, shaft 12 carries second and third drive members or female cone members 20 and 22 having frusto-conical concave interior rim portions or faces 20a and 22a, respectively. Female cone members 20 and 22 are both mounted on shaft 12 so that they rotate freely thereon and also be axially moveable thereon over a range of travel toward and away from male cone member 18. This arrangement provides a cone clutch wherein the second and third drive members are oppositely coned female clutch members and the first drive member is a mating coned male clutch member.

As is the case with many clutches, this one is preferably carried inside a housing 11 which contains a substantial amount of oil. For example, the clutch members may be partially or wholly immersed in lubricating oil. It is therefore preferred that either the rim portions of 20a and 22a or the face portions 18a and 18b of member 18 (as shown in FIG. 1) be provided with a plurality of small grooves 24 arranged to wipe oil from therebetween when any of the surface portions of these members come into mutual contact during operation of the clutch. This may be further understood as to purpose and arrangement by having reference to the teaching set forth in the Society of Automotive Engineers paper No. 311B entitled Automatic Transmission Friction Elements by Froslie, Milek and Smith, which was delivered at the SAE meeting of Jan. 9–13, 1964, with particular reference to pp. 2–3 thereof.

To provide stable axial movement for female cone members 20 and 22, they are each fixed to a bushing 26 and 28 respectively for sliding movement on shaft 12. Each of the bushings includes an extending portion 26a and 28a respectively, best illustrated in FIG. 7 which provide for stable sliding movement of each female cone on shaft 12.

Each female cone member 20 and 22 is provided with means generally designated 30 (FIGS. 2 and 3) for selectively moving the female cone into and out of contact with the male cone member 18. Preferably, means 30 will take the form of a pair of arcuate fork members 32 and 34 slidably mounted on a rail 36. Each of the fork members is connected to one of the female cones. A preferred arrangement for this connection is shown in the drawings and includes an annular member 38 fitted to each of the female cones as by the screw threads on the extending portion of the cone as shown in FIGS. 1 and 7. Each member 38 carries a ring 40 having an annular groove 42. Ring 40 is positioned between two annularly distributed sets of needle bearings indicated at 44 which facilitate rotation of ring 40 relative to its corresponding female cone member. In addition to decreasing friction between the forks and the clutch members which receive them, the making and breaking of contact between the male cone member and the respective female cone member is facilitated with less effort by use of such a bearing arrangement. Means 30 will preferably be designed to provide simultaneous movement of the forks and female cone members as by tying the two forks together for simultaneous movement through a sleeve 41 which slides on rail 36. The forks may be attached to the sleeve by bolts as shown in FIGS. 2 and 3. With such an arrangement both female cones may be readily placed in a neutral condition relative to male cone member 18, as shown in FIGS. 1 and 9. Also, one or the other of the female cones may be selectively brought into contact with the male cone member to provide a forward or reverse driving condition. A driving condition is illustrated in FIG. 8 which shows female cone 20 contacting male cone 18 to provide a forward condition (arbitrarily selected) for output shaft 16.

The rotation of output shaft 16 is provided by interaction between three gears. Two of the gears 46 and 48 are carried on input shaft 12 while the third gear 50 is placed between the first two gears so as to constantly intermesh with them. Gears 46 and 48 are axially fixed on shaft 12 but freely rotatable thereon whereby rotation of either gear causes rotation of gear 50 and hence rotation of output shaft 16. Minor axial movement of the gears 46 and 48 may occur on shaft 12. For example, movement of 0.010 inch or less has been experienced with these gears in operation without any malfunction. It can be said that the gears are substantially axially fixed on the shaft.

In the embodiment shown in FIGS. 1–8, gears 46 and 48 are driven by the respective female cone to which they are adjacent and abut. Each gear is placed on shaft 12 adjacent a side of the respective female cone which is opposite the female cone side to which the male cone is adjacent. In other words, each female cone is positioned between the male cone and one of the rotatable gears 46 or 48.

Interconnection for coaction between the female cone members and their adjacent abutting gear is constantly provided by sets of a plurality of complementary radially distributed overlapping helical camming surfaces, generally designated at 52 and 54 (best seen in FIGS. 7, 8 and 9) which are carried on adjacent abutting portions of the female cone-gear pairs 20–46 and 22–48 respectively. The helical surfaces are formed on adjacent portions of the female cone-gear pairs as shown in the form of cylindrical abutting end portions or side portions thereof, 52 and 54 respectively. As shown in FIG. 7, it is preferred that three driving or active helical surfaces be provided on each member of each set. However, two per member or more than three are acceptable.

For the embodiment shown in FIGS. 1–8, the spiral direction of the helical surfaces is in an opposite direction for each cone-gear pair 20–46 and 22–48, i.e., the helical surfaces are "opposite handed" to provide proper coaction for opposite directions of rotation of output shaft 16 depending on which cone-gear pair is driving gear 50 and is being driven in turn by male cone 18. As is illustrated in FIG. 8, the helical surfaces may be symmetrical and alternate surfaces may be used to obtain "opposite handedness". Thus, in FIG. 7, helical surfaces 52a on the female cone-gear pair 20–46 would coact to drive gear 50 through gear 46; rotation of gear 46 and female cone 20 being in the direction indicated by the arrows. On the other hand, due to the symmetrical arrangement of the surfaces flipping cone 20 and gear 46 through 180° will allow them to function as female cone-gear pair 22–48. In such an instance, the drive action will be through helical surfaces 54a. As shown, the helical surfaces 52a of cone-gear pair 20–46 spiral in one direction for engagement between the cone-pair 20–46 rotate on shaft 12 when cone 20 drives gear 46 or when gear 46 idles and drives cone 20; see FIGS. 7 and 8. On the other hand, the helical surfaces 54a of cone-gear pair 22–48 spiral in a second direction for engagement between those members.

Since the helical surfaces of each cone-gear pair are constantly overlapping over the entire extent of the axial travel of each female cone, constant driving engagement between each female cone-gear pair is readily provided when the female cone is brought into contact with the rotating male cone 18. Interaction of the helical surfaces upon rotation also provides a positive force which urges the female cone against the male cone to improve the coupling action therebetween.

Each of the gears 46 and 48 rests against a thrust washer 56 and 58, respectively, on shaft 12. The thrust washers in turn rest against a set of bearings and races generally indicated at 60 and 62. The thrust washers are fixed to shaft 12 and rotate with it. Also, thrust washer 58, which is at the end of shaft 12, is especially adapted to cause circulation of the lubricating oil in which the clutch is operated inside housing 11. The oil is circulated to various clutch members on the shaft by the thrust washer. This is accomplished by providing thrust washer 58 with paddle-like extensions 64 which, upon rotation of washer 58, push the oil rearwardly of the end of shaft 12 through conduits 66 in housing 11 and into cavity 68 as indicated by the arrows in FIG. 1. Shaft 12 is provided longitudinally with a hollow center portion 70 and also with a plurality of spaced radiating conduits 72 extending therefrom to the outside surface of the shaft for allowing oil to flow from cavity 68 through hollow portion 70 of shaft 12 and then outwardly to various locations along the shaft to the clutch members as indicated by the arrows in FIG. 1. Various clutch members may also be provided with oil passages 74 as are shown in FIGS. 4 and 5 on thrust washer 58 by way of example.

The clutch described above operates as follows. As is common, the rotary output of an engine is normally in one given direction. Thus, rotation of shaft 12 will be unidirectional, for example, in the counter-clockwise direction indicated by the arrow in FIG. 1. and viewed from the aft end of the shaft, i.e., the right handed end shown in FIG. 1. All references to rotation are made from this vantage point in the specification. It follows that male cone 18 will be unidirectional in rotation also and will rotate with input shaft 12 in the same direction. Axial movement of female cone 20 into contact with male cone 18 as shown in FIG. 8 causes rotation of gear 46 through the engaged overlapping helical surfaces 52a and rotation of meshing gear 50 and output shaft 16 in a first rotary direction. During this action, gear 50 causes gear 48 and female cone 22 to idle on shaft 12 and rotates in an opposite direction.

If female cone 20 is moved away from male cone 18 and female cone 22 is placed in contact with the male cone, rotation of gear 48 occurs the same direction as that of previously rotating gear 46 and meshing gear 50 follows in the opposite rotary direction along with output shaft 16.

Engagement and disengagement between the conical surfaces of the female cones and the male cone is facilitated by making the conical angles thereof slightly different to obtain a slight mismatch therebetween. For example, as illustrated in FIG. 8, the angle A of the male cone face 18a is lesser than the angle B of the face 22a of the female cone 22.

Other arrangements of the clutch members are possible. For example, in FIG. 9, the clutch members are arranged vertically on the output shaft 16 and the intermeshing gear 50 is placed on the input shaft 12 to function as an input gear which drives the two gears 46 and 48 on output shaft 16. Axially movable female cone members 20 and 22 are rotated through sets of helical surfaces 52 and 54, respectively, and are selectively engageable with male cone member 18, which is fixed to shaft 16, to drive it in opposite rotary directions and hence to provide reverse rotation to output shaft 16. A neutral condition may be obtained as before by positioning both female cones away from the male cone. In this arrangement the driving helical surfaces of both sets are arranged in the same spiral direction rather than being "opposite handed" as in the other embodiment.

What is claimed is:

1. The combination of rotatable input shaft means,
    a first drive member fixed to the input shaft means and rotatable therewith,
    second and third drive members on the input shaft means, axially movable and independently rotatable thereon and positioned one to each side of the first drive member,
    adjacent portions of the first drive member and the second and third drive members being provided with cooperating means for forming a driving-driven relationship when either of the second or third drive members is axially moved into contact with the first drive member thereby causing rotation of the second or third drive member by the first drive member upon its rotation,
    means for selectively placing the second and third driven members into individual contact with the first drive member and for placing both of the second and third drive members out of contact with the first drive member,
    two gears in a substantially axially fixed position on the input shaft means and independently rotatable thereon, each gear being positioned adjacent a side of either of the second and third members which side is opposite the side for contacting the first drive member, the two gears and the second and third drive members forming two drive member-adjacent gear pairs, and
    a plurality of complementary, radially distributed, overlapping, helical camming surfaces on adjacent portions of the second and third drive members and the gears, the surfaces extending between each drive member-gear pair to couple them together for rotation, the complementary helical surfaces of one drive member-gear pair being opposite handed relative to those of the other drive member-gear pair, the camming surfaces of each pair being in mutual overlapping relationship over the complete range of axial movement of the respective second or third drive members whereby contact and rotation of either the second or third drive member with the first drive member causes rotation of the respective adjacently coupled gear through driving engagement between the corresponding complementary camming surfaces and the driving engagement of the camming surfaces urges the second or third drive member axially toward the drive member for more positive contact therewith while continuing to rotate the adjacent gear.

2. The combination of claim 1 wherein the cooperating means of the first drive member and the second and third members are adjacent faces.

3. The combination of claim 2 wherein at least one of the faces includes an arrangement of grooves thereon for improved contact therebetween.

4. The combination of claim 1 including a third gear intermeshing with both axially fixed gears so as to constantly intermesh with them for providing a rotary output from the combination.

5. The combination of claim 2 as a cone clutch wherein the second and third drive members are oppositely coned female clutch members and the first drive member is a mating cone male clutch member.

6. The combination of claim 1 wherein the adjacent portions of the second and third drive members and the gears which provide and carry the helical camming surfaces are cylindrical abutting end portions of the driven members and gears respectively.

7. The combination of claim 6 wherein each end portion has at least two helical camming surfaces formed thereon.

8. The combination of claim 4 wherein the third gear is positioned below the axially fixed gears and it rotates an output shaft means.

9. The combination of claim 5 including fork means connected to the female cones for selectively axially positioning them.

10. The combination according to claim 1 wherein the second and third drive members take the form of female cones having a concave side for contacting the first drive member and an opposite side,
    sliding bushing stabilizer means carrying the female cone on the shaft, the bushing extending outwardly a distance from the opposite side of the female cone,
    the radial helical surfaces being distributed peripherally around the outside diameter of the extending part of the bushing.

11. The combination of
    rotatable shaft means,
    a first drive member fixed to the shaft means and rotatable therewith,
    second and third drive members on the shaft means and axially moveable and independently rotatable thereon and positioned one to each side of the first drive member,
    adjacent portions of the first drive member and the second and third drive members being provided with cooperating surfaces for forming a driving-driven relationship when either the second or third drive member is axially moved into contact with the first drive member,
    means for selectively placing either of the second or third drive members into contact with the first drive member and for placing both the second and third drive members out of contact with the first drive member,
    two gears substantially axially fixed on the input shaft means and independently rotatable thereon, each gear being positioned adjacent a side of the second and third drive members which is opposite the side for contacting the first drive member and forming two drive member-adjacent gear pairs, and a plurality of complementary, radially distributed, overlapping, helical camming surfaces on adjacent portions of the second and third drive members and the two gears, the surfaces extending between each paired drive member-gear pair to couple them together for rotation, the camming surfaces of each pair being in mutual over-lapping relationship over the complete range of axial movement of the respective drive member whereby contact and rotation of either the second or third drive member with the first drive member causes mutual rotation therebetween along with rotation of the respective adjacently coupled gear and the driving engagement between the corresponding complementary camming surfaces urges the contacting drive members axially toward each other for more positive contact therebetween while continuing the rotation.

12. The combination of claim 10 including a third gear intermeshing with the first two gears so as to constantly intermesh with them.

13. The combination of claim 11 wherein the third gear is an input gear and the shaft means is an output means.

14. The combination of claim 11 wherein the third gear is an output means and the shaft means is an input means.

15. The combinatin according to claim 11 wherein the shaft is hollow for allowing lubricating oil to flow therethrough and a plurality of radial conduits are distributed over its length for allowing the oil to flow to the exterior thereof for lubricating the various clutch members.

16. The combination according to claim 15 including rotary oil impeller means carried by the shaft for circulating oil through the shaft.

17. The combination according to claim 16 wherein the oil impeller means is located near one end of the shaft.

18. The combination according to claim 16 wherein the oil impeller means takes the form of a thrust washer positioned on the shaft adjacent one of the gears and the washer includes a plurality of paddle-like radial extensions whereby rotation of the thrust washer by the shaft causes oil circulation toward one end of the shaft and into its hollow interior.

19. The combination according to claim 11 as a cone clutch wherein the second and third drive members are oppositely coned female clutch members and the first drive member is a mating coned male clutch member.

20. The combination according to claim 19 wherein the cone faces of the male and female cone clutch members are slightly mismatched angularly to facilitate disengagement thereof with lesser effort.

* * * * *